United States Patent
Nguyen et al.

(10) Patent No.: US 7,391,534 B2
(45) Date of Patent: Jun. 24, 2008

(54) METHODS AND SYSTEMS FOR DISCOVERING PRINTMODES SUPPORTED BY A PRINT ENGINE

(75) Inventors: Trung Vu Nguyen, Portland, OR (US); Thieu X. Dang, Vancouver, WA (US); Lihua Xie, Vancouver, WA (US); Brooke Hoyer, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1037 days.

(21) Appl. No.: 10/447,780

(22) Filed: May 29, 2003

(65) Prior Publication Data

US 2004/0239972 A1 Dec. 2, 2004

(51) Int. Cl.
*G06F 7/00* (2006.01)
*B41J 2/00* (2006.01)

(52) U.S. Cl. .......... 358/1.9; 358/1.13; 399/82; 399/85; 707/100; 707/101; 707/102

(58) Field of Classification Search .......... 358/1.9, 358/1.13, 1.15, 442; 399/82, 85; 707/100–102
See application file for complete search history.

(56) References Cited

U.S. PATENT DOCUMENTS

| | | | | |
|---|---|---|---|---|
| 5,418,904 A | * | 5/1995 | Tomiyasu et al. | 358/1.15 |
| 5,694,529 A | * | 12/1997 | Fromherz | 358/1.15 |
| 6,738,151 B1 | * | 5/2004 | Kato | 358/1.12 |
| 6,898,389 B2 | * | 5/2005 | Osada | 399/81 |

* cited by examiner

*Primary Examiner*—Douglas Q. Tran
*Assistant Examiner*—Chan S. Park (57) ABSTRACT

In accordance with one embodiment, a method comprises querying, with a querying component, a print engine to ascertain one or more printmodes that are supported by the print engine, and, receiving, responsive to the querying, a list that describes printmodes supported by the print engine.

26 Claims, 4 Drawing Sheets

METHODS AND SYSTEMS FOR DISCOVERING PRINTMODES SUPPORTED BY A PRINT ENGINE

TECHNICAL FIELD

This invention relates to printer methods and systems. More particularly, the invention relates to printmodes and their use in connection with printers, such as inkjet and laser printers.

BACKGROUND

Printers, such as inkjet printers and laser printers, use what are called "printmodes" to facilitate printing upon print media. A printmode typically refers to a set of controls and resources that instruct a print engine on how to print a page. Printmodes may allow a trade-off between speed and image quality. For example, a printer's draft mode provides the user with readable text relatively quickly. Presentation, also known as best mode, may be relatively slow but may produce relatively high image quality. Normal mode is a compromise between draft and presentation modes. Printmodes allow the user to choose between these trade-offs. Different printmodes can also be employed depending on the media type.

Print engines can typically have a number of different printing algorithms that provide the print engine with flexibility as it allows a user to select between tradeoffs associated with print quality and performance over different media types. For example, some users might prefer faster print outs, while others might prefer higher quality. Printmodes can control both the selection of an appropriate printing algorithm and its proper execution. Thus, print engines can support multiple different printmodes that are designed to serve different user needs.

SUMMARY

In accordance with one embodiment, a method comprises querying, with a querying component, a print engine to ascertain one or more printmodes that are supported by the print engine, and, receiving, responsive to the querying, a list that describes printmodes supported by the print engine.

BRIEF DESCRIPTION OF THE DRAWINGS

The same numbers are used throughout the drawings to reference like features and components.

DETAILED DESCRIPTION

Overview

Methods and systems of ascertaining the printmodes that are supported by print engines are described. In accordance with one embodiment, a component within the printer can query the print engine to ascertain the printmodes that are supported by the print engine. The print engine receives the query and responsive thereto, prepares a list that describes the printmodes that it supports. This list is then sent to the querying component. The querying component can now process data associated with print jobs and take actions to effect printing using information contained in the list. Hence, the querying component can flexibly acquire knowledge of the print engine's supported printmodes.

In accordance with one embodiment, the querying component can comprise a printer controller or formatter.

Exemplary Printing Device Embodiment

Figure 1:
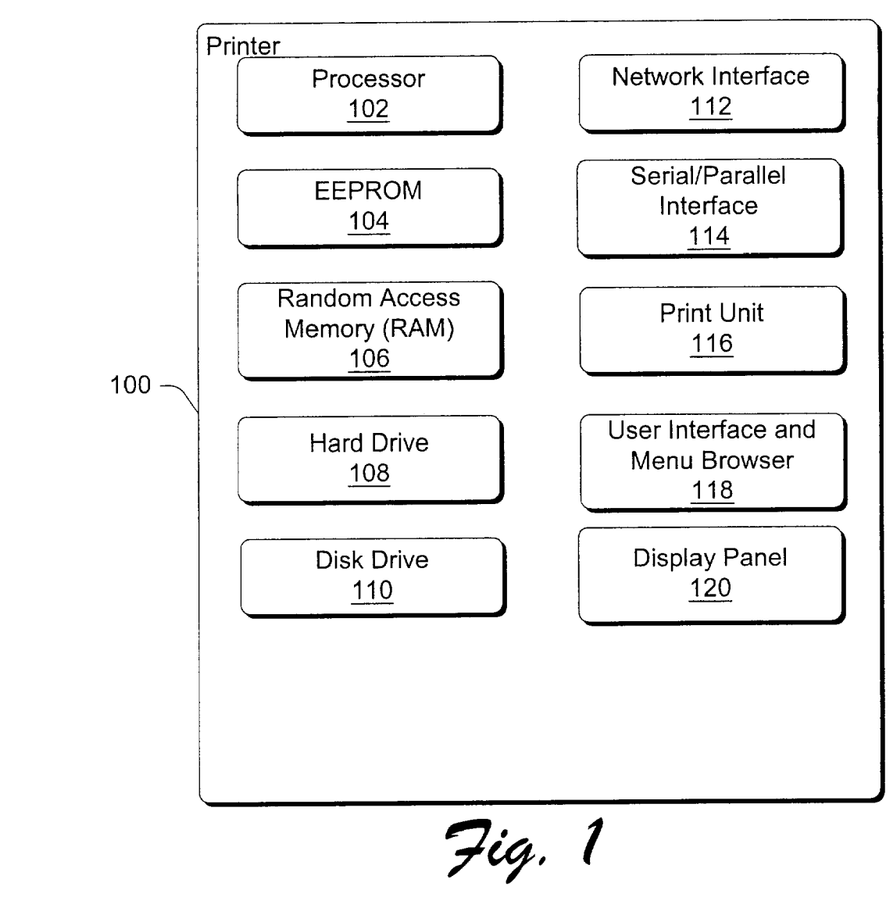
FIG. 1 is a block diagram showing exemplary components of a printing device in accordance with one embodiment.

FIG. 1 is a block diagram showing exemplary components of a printing device in the form of a printer 100 that can be used in accordance with one or more of the embodiments described below.

While FIG. 1 illustrates a specific type of printing device, it should be appreciated that other printing devices such as facsimile machines, copiers, and the like can be utilized without departing from the spirit and scope of the claimed subject matter. In addition, the term "printer" or "printing device" as used in this document will be understood to include multi-function devices that, in addition to printing, perform additional functions. Such additional functions can include, without limitation, one or more of the following: faxing, copying, scanning and the like.

Printer 100 includes a processor 102 and at least one computer-readable media. In this example, the computer readable media can include an electrically erasable programmable read-only memory (EEPROM) 104 and a random access memory (RAM) 106. Further, the computer-readable media can include a hard drive 108. Processor 102 processes various instructions to operate the printer 100 and communicate with other devices. Processor 102 can include a printer controller or formatter. Part of the job of a printer controller or formatter is to take data associated with a user's print job, and process it to provide data that is used to operate the printer. For example, in an inkjet printer, a controller can take data associated with a print job and convert it into raster data that can be used to fire pens of a print cartridge. In a laser printer, a formatter can take data associated with a print job and convert it into raster data that is then used to modulate a laser during printing of the print job.

The EEPROM 104, RAM 106, and/or hard drive 108 can store various information such as configuration information, fonts, templates, data being printed, and menu structure information.

In addition, although not shown in FIG. 1, a particular printer may also contain a ROM (non-erasable) in place of or in addition to EEPROM 104. Furthermore, a printer may alternatively contain a flash memory device in place of or in addition to EEPROM 104.

Printer 100 can also include a disk drive 110, a network interface 112, and a serial/parallel interface 114. Disk drive 110 provides additional storage for data being printed or other information used by the printer 100. Although both RAM 106 and disk drive 110 are illustrated in FIG. 1, a particular printer may contain either RAM 106 or disk drive 110, depending on the storage needs of the printer. For example, an inexpensive printer may contain a small amount of RAM 106 and no disk drive 110, thereby reducing the manufacturing cost of the printer. Network interface 112 provides a connection between printer 100 and a data communication network. Network interface 112 allows devices coupled to a common data communication network to send print jobs, menu data, and other information to printer 100 via the network. The network interface can be embodied as a network server and, more particularly, as a Web server. As a network server or Web server, the network interface can enable a user to access the printer using standard network protocols. For example, as a Web server, the network interface can enable two-way communication with one or more clients via standard network protocols such as TCP/IP.

Serial/parallel interface 114 can also provide a data communication path directly between printer 100 and another device, such as a workstation, server, or other computing device. Although the printer 100 shown in FIG. 1 has two interfaces (network interface 112 and serial/parallel interface 114), a particular printer may only contain one interface.

Printer 100 also includes a print unit 116 that can comprise a print engine. As such, the print unit 116 can comprise mechanisms that are arranged to selectively apply fluid or ink (e.g., liquid ink, toner, etc.) to a print media (e.g., paper, plastic, fabric, etc.) in accordance with print data within a print job.

Thus, for example, print unit 116 can include a conventional laser printing mechanism or print engine that selectively causes toner to be applied to an intermediate surface of a drum or belt. The intermediate surface can then be brought within close proximity of a print media in a manner that causes the toner to be transferred to the print media in a controlled fashion. The toner on the print media can then be more permanently fixed to the print media, for example, by selectively applying thermal energy to the toner.

The print unit 116 can also comprise an ink jet print unit or print engine that utilizes principles of ink jet printing. Those skilled in the art will recognize that there are many different types of print units or print engines available, and that for the purposes of the present discussion, print unit 116 can include any of these various types.

Printer 100 can also contain a user interface/menu browser 118 and a display panel 120. User interface/menu browser 118 allows the user of the printer to navigate the printer's menu structure. User interface 118 may be a series of buttons, switches or other indicators that are manipulated by the user of the printer. Display panel 120 is a graphical display that provides information regarding the status of the printer and the current options available through the menu structure.

The illustrated printer can, and typically does include software that provides a runtime environment in which software applications or applets can run or execute. The runtime environment can facilitate the extensibility of the printer by allowing various interfaces to be defined that, in turn, allow applications or applets to interact with the printer in more robust manners.

It will be appreciated that the techniques and methods described herein can include all forms of computer-readable media when such media contains instructions which, when executed by a processor or computer, implement the techniques and methods.

Exemplary Client

Figure 2:
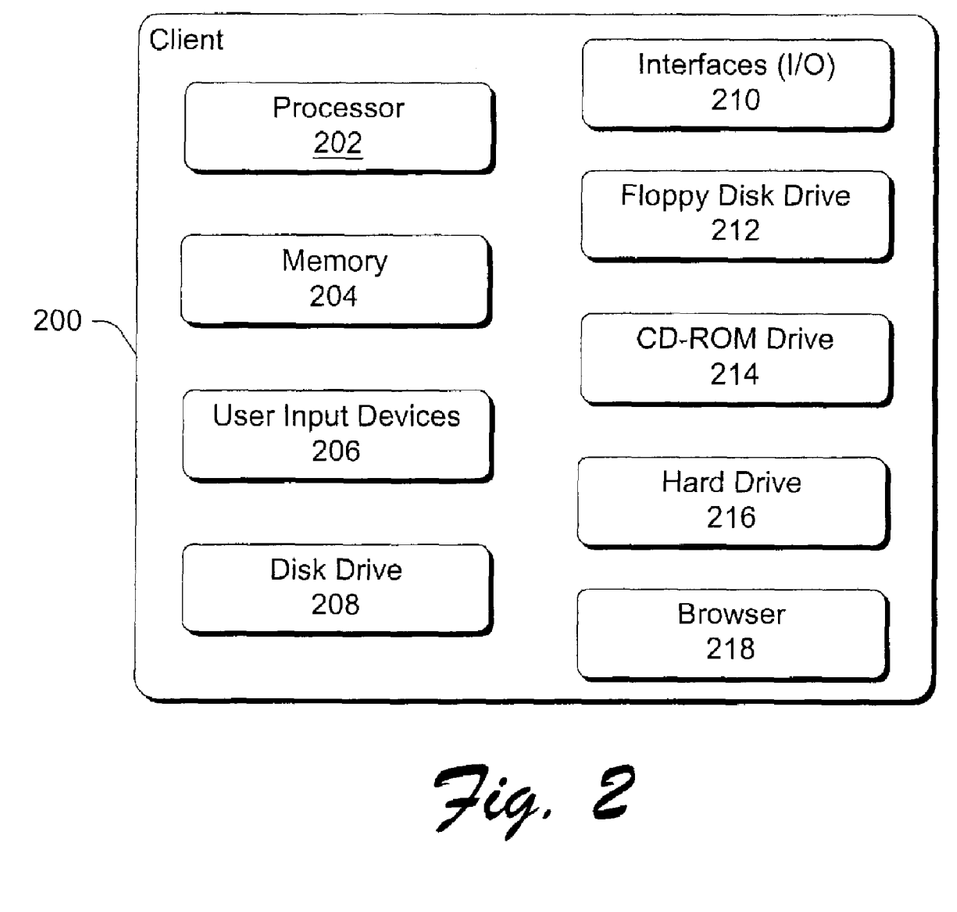
FIG. 2 is a block diagram showing exemplary components of a client device that can be utilized in connection with the FIG. 1 printing device.

FIG. 2 is a block diagram showing exemplary components of an exemplary client or host computer 200. Computer 200 includes a processor 202, a memory 204 (such as ROM and RAM), user input devices 206, a disk drive 208, interfaces 210 for inputting and outputting data, a floppy disk drive 212, and a CD-ROM drive 214.

Processor 202 performs various instructions to control the operation of computer 200. Memory 204, disk drive 208, and floppy disk drive 212, CD-ROM drive 214 and a hard drive 216 can provide data storage mechanisms. User input devices 206 includes a keyboard, mouse, pointing device, or other mechanism for inputting information to computer 200. Interfaces 210 provide a mechanism for computer 200 to communicate with other devices. Client 200 can also include a browser 218 that can allow a user to browse the Web. Exemplary browsers can include Microsoft's Internet Explorer or Netscape's Navigator.

Exemplary Systems

Figure 3:
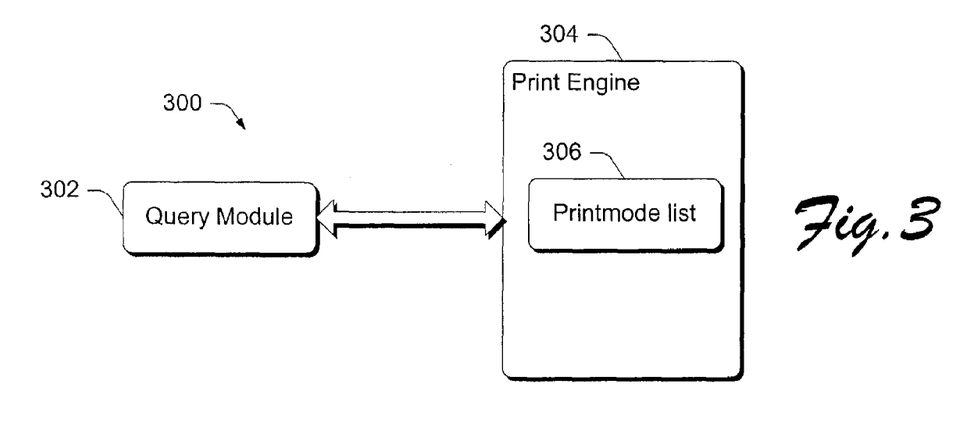
FIG. 3 is a block diagram that illustrates a system in accordance with one embodiment.

FIG. 3 is a block diagram that shows a system 300 in accordance with one embodiment. System 300 comprises, in this embodiment, a query module or component 302 and a print engine 304 that maintains a printmode list 306 of the print modes that it supports.

In this embodiment, query module 302 is configured to query print engine 304 to ascertain the printmodes that the print engine supports. Communication between the query module and the print engine can take place through a suitable interface. An example of such an interface is an application program interface (API) that supports callable methods. In one embodiment, the API can be called via a Remote Procedural Call (RPC) mechanism between the query module and a print engine application. For example, one method that can be supported can be a "Get_Printmode" method that returns a list of the printmodes that the print engine supports.

Upon receiving a query from the query module, the print engine 304 can look up a list of printmodes that its supports. The print engine can then return a list of the printmodes to the query module so that the query module can take whatever actions may be appropriate. In one embodiment, returning a list of the printmodes can occur responsive to receiving an API call, as noted above.

For example, with knowledge of the printmodes that are supported by the print engine, the query module can see to it that an accurate user interface is presented to a user on, for example, a client device so that the user can select printmodes that are supported by the print engine. Alternately or additionally, the query module can see to it that the printer processes data associated with a print job so that the data is properly formatted, in accordance with a selected printmode, and provided to the print engine for further processing.

It is to be appreciated that the query module can be implemented in any suitable hardware, software, firmware or combination thereof. Additionally, the query module can comprise a standalone component, or can comprise part of another component, either within or outside of the printer that embodies the print engine.

Figure 4:
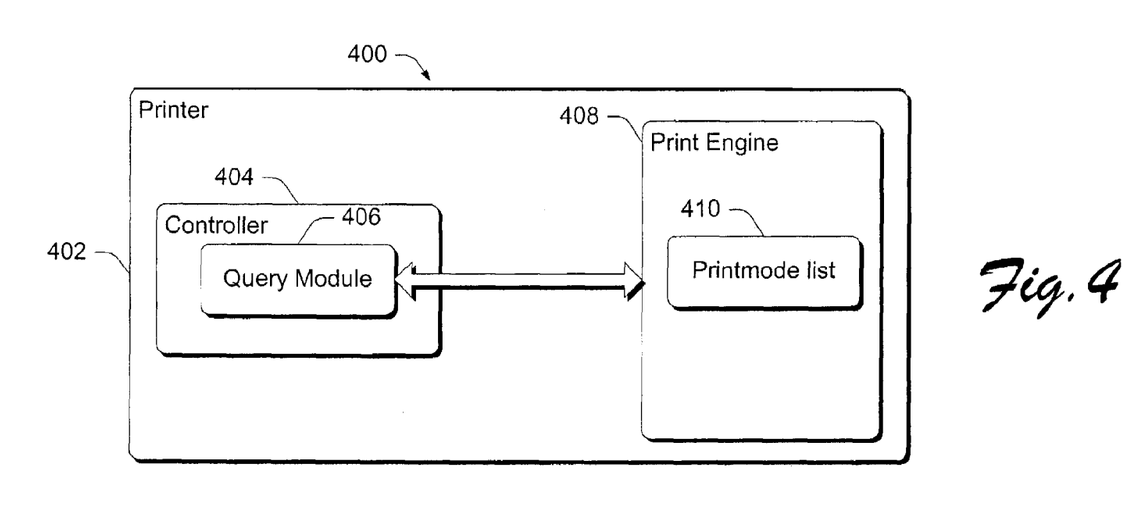
FIG. 4 is a block diagram that illustrates a system in accordance with one embodiment.

FIG. 4 is a block diagram that shows a system 400 in accordance with one embodiment. System 400 comprises, in this embodiment, a printer 402 embodying a controller 404 having a query module 406, and a print engine 408 that maintains a printmode list 410 of the print modes that it supports.

It is to be appreciated and understood that the printer can have additional components, such as those that are described in connection with FIG. 1. For the sake of brevity and because such exemplary components have already been described above, those additional components are not included in the present diagram.

In this example, controller 404, utilizing the query module 406, is configured to query print engine 408 to ascertain the printmodes that the print engine supports. Communication between the controller and the print engine can take place through a suitable interface. Upon receiving a query from the controller, the print engine 408 can look up a list of printmodes that it supports. The print engine can then return a list of the printmodes to the controller so that the controller can take whatever actions may be appropriate. For example, with knowledge of the printmodes that are supported by the print engine, the controller can see to it that an accurate user interface is presented to a user on, for example, a client device so that the user can select printmodes that are supported by the print engine. Alternately or additionally, the controller can see to it that the printer processes data associated with a print job so that the data is properly formatted, in accordance with a selected printmode, and provided to the print engine for further processing.

For example, after ascertaining the printmode capabilities of the print engine, the controller can process data associated with a print job to format the data in accordance with a format that is associated with a particular print mode. Specifically, the controller might, for example, process the data associated with the print job to provide raster data that is in a format that corresponds to the selected print mode. The controller can then send an indication of the desired print mode, along with the properly formatted raster data, to the print engine so that the print engine can use the raster data to print the print job. Specifically, when it receives the indication of the particular printmode along with the raster data, the print engine can select an appropriate printing algorithm that is associated with the printmode and can then print the print job.

Exemplary Methods

Figure 5:
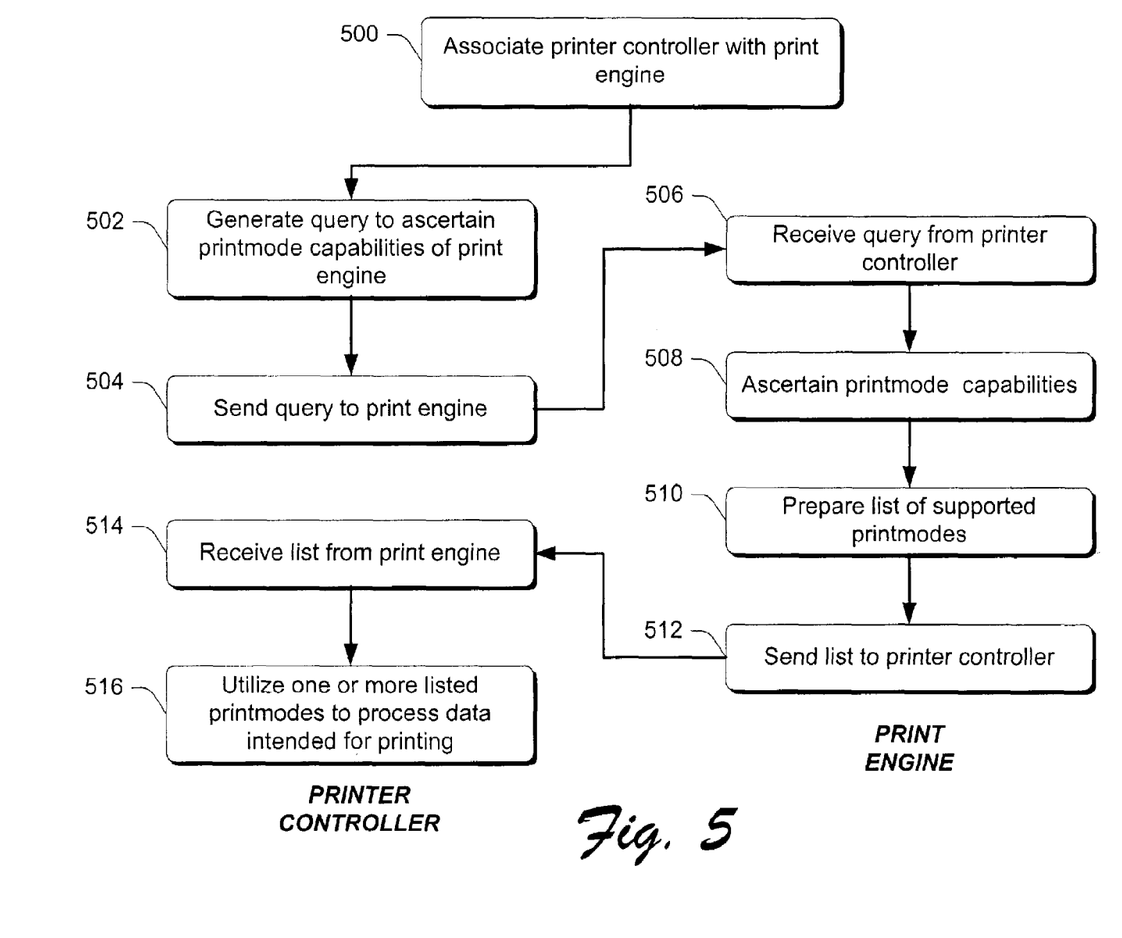
FIG. 5 is a flow diagram that describes steps in a method in accordance with one embodiment.

FIG. 5 is a flow diagram that illustrates steps in a method in accordance with one embodiment. The method can be implemented in any suitable hardware, software, firmware or combination thereof. Preliminarily notice that certain steps described below are illustrated as being performed by a printer controller, while other acts are illustrated as being performed by a print engine.

Step 500 associates a printer controller with a print engine. This step can be performed at any suitable time and through any suitable actions. As but one example, consider the following. Typically, individual components of a particular printer may be made or otherwise manufactured by different entities or vendors. For example, one vendor may make print engines, and another vendor may make printer controllers. Accordingly, this step can be performed, in this example, when the printer controller and print engine are assembled together within the housing of a printer for the first time.

For example, an original equipment manufacturer may make their own printer controllers, but may desire to use another's print engine. By imparting querying capabilities to the printer controller, one type of printer controller can be used with various different types of print engines. Thus, where the potentially different types of print engines that might be employed with a particular printer controller can support different printmodes, the printer controller can query an individual print engine and can then adapt its operation to support the print engine's printmodes. This provides for a flexible printer controller.

Continuing, step 502 generates a query to ascertain printmode capabilities of the print engine, and step 504 sends the query to the print engine. The query can be sent using any suitable interface or channel between the printer controller and the print engine.

Step 506 receives, with the print engine, the query that is sent from the printer controller. Step 508 then ascertains the print engine's capabilities. This step can be performed any suitable way. For example, the print engine can maintain a list of the print modes that it supports. Responsive to receiving the query, the print engine can access the list. Step 510 prepares a list of supported print modes. Any suitable format can be utilized to prepare or otherwise encapsulate the list. In one embodiment, described below in the section entitled "In Operation—Implementation Example", Extensible Markup Language (XML) is utilized to encapsulate data that describes the printmodes.

Step 512 then sends the list to the printer controller. Step 514 receives, with the printer controller, the list that was prepared by the print engine. Step 516 utilizes one or more listed printmodes to process data that is intended for printing. This step can be performed in any suitable way. For example, this step can be performed by receiving a user's selection of a particular desired print mode, and then processing the user's data to format it into a format that is associated with the print mode. The printer controller can then send the formatted data, as well as an indication of the print mode to use, to the print engine so that the print engine selects an appropriate printing algorithm to print the data.

In Operation—Implementation Example

In operation, any suitable mechanism can be utilized to facilitate communication between the printer controller and the print engine. For example, the print engine can have an interface that can be called by the printer controller, and a return mechanism to return the printmode list to the printer controller.

In one embodiment, the list that is returned from the print engine to the printer controller comprises an XML list or string that encapsulates the data that is returned to the printer controller. As an example, consider the exemplary XML encapsulated printmode list just below:

```
<?xml version="1.0" encoding="utf-8"?>
<query-reply>
<pmode-reply media="glossy" quality="best" pq="10">
<component layout="00000000RRRRRRRRGGGGGGGGBBBBBBBB" hres="300" vres="300"/>
</pmode-reply>
<pmode-reply media="plain" quality="normal" pq="7">
<component layout="KK" hres="600" vres="600"/>
<component layout="CC" hres="600" vres="600"/>
<component layout="MM" hres="600" vres="600"/>
<component layout="YY" hres="600" vres="600"/>
</pmode-reply>
<pmode-reply media="plain" quality="draft" pq="5">
<component layout="KK" hres="300" vres="300"/>
<component layout="CC" hres="300" vres="300"/>
<component layout="MM" hres="300" vres="300"/>
<component layout="YY" hres="300" vres="300"/>
</pmode-reply>
</query-reply>
```

Here, the XML tags <query-reply>, </query-reply> encapsulate the data that is to be returned indicating the print modes that are supported by the print engine. When the printer controller receives the XML list, in accordance with one embodiment, it parses the XML list to retrieve the printmode information. The data describing the individual printmodes are encapsulated by the XML tags <pmode-reply>, </pmode-reply>. In this particular example, there are three printmodes that are supported by the print engine: (1) a glossy-best mode with 8-bit 0RGB data, (2) a plain-normal mode with 2-bit KCMY data, and (3) a plain-draft mode with 2-bit KCMY data.

When the printer controller receives this list of printmodes, it can convey the available printmodes to a user via some form of user interface.

CONCLUSION

Various methods and systems described above can enable a query component to discover a list a printmodes supported by a particular print engine. Discovering printmode capabilities can provide several benefits. For example, when the query component is incorporated in the printer controller or otherwise in contact with the printer controller, the controller need not store a printmode list of any particular print engine. Rather, the printer controller can simply communicate with the print engine at the appropriate time, to ascertain a list of the printmodes supported by the print engine. Additionally, flexibility is enhanced in that the printer controller can work with multiple different print engines, without having to be specifically programmed for just one print engine. Thus, for example, designers can design the printer controller as a type of platform that can then be adapted to work with print engines of different types. Further, the printer controller, by virtue of the querying capabilities of the query component, can have an up-to-date printmode list which, if and when a particular print engine changes, can be easily updated and adapted to a new print engine.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

We claim:

1. A method comprising:
   querying, with a querying component, a print engine to ascertain one or more printmodes that are supported by the print engine; and
   receiving, responsive to said querying, a list that describes printmodes supported by the print engine, wherein the act of receiving comprises receiving an XML list that describes the printmodes.

2. The method of claim 1, wherein the act of querying is performed by the querying component comprising a printer controller.

3. The method of claim 1, wherein the act of querying is performed by the querying component comprising a formatter.

4. The method of claim 1, wherein the act of querying is performed by the querying component that resides inside a printer that contains the print engine.

5. The method of claim 1, wherein the act of querying comprises calling an application program interface (API).

6. A method comprising:
   receiving, with a print engine, a query from a query component, the query being configured to ascertain one or more printmodes that are supported by the print engine;
   responsive to receiving said query, preparing a list that describes printmodes supported by the print engine, wherein the act of preparing comprises preparing an XML list that describes the printmodes; and
   sending said list to the query component.

7. The method of claim 6, wherein the act of receiving is performed by a print engine configured to effect inkjet printing.

8. The method of claim 6, wherein the act of receiving is performed by a print engine configured to effect laser printing.

9. The method of claim 6, wherein the act of receiving comprises receiving said query from the query component comprising a printer controller.

10. The method of claim 6, wherein the act of receiving comprises receiving said query from a query component comprising formatter.

11. The method of claim 6, wherein the act of receiving comprises receiving an application program interface (API) call.

12. A system comprising:
    a querying component configured to:
    query a print engine to ascertain one or more printmodes that are supported by the print engine;
    receive, responsive to said query, a list that describes printmodes supported by the print engine; and
    take one or more actions to effect printing using one or more printmodes supported by the print engine;
    wherein the query component is configured to receive said list as an XML list that describes the printmodes supported by the print engine.

13. The system of claim 12, wherein the query component is configured to be mounted inside a printer that contains the print engine.

14. The system of claim 12, wherein the query component comprises a printer controller.

15. The system of claim 12, wherein the query component comprises a formatter.

16. A system comprising:
    a printer controller configured to:
    query a print engine to ascertain one or more printmodes that are supported by the print engine;
    receive, responsive to said query, a list that describes printmodes supported by the print engine, wherein the act of receiving comprises receiving an XML list that described the printmodes;
    take actions to effect printing using one or more printmodes supported by the print engine, said actions comprising at least one or more of:
    causing a user interface to be presented to a user, said user interface being configured to present printmodes for user selection;
    processing data associated with a print job to format the data in accordance with a selected printmode; and
    sending an indication of a printmode and formatted data to a print engine.

17. A printer embodying the printer controller of claim 16.

18. A system comprising:
    a print engine;
    an interface supported by the print engine, the interface being configured to be queried by a query component to ascertain one or more printmodes that are supported by the print engine;
    the print engine further being configured to:
    maintain a list of the printmodes that it supports;
    prepare a response to queries that it receives, said response describing the printmodes; and
    send the response to the query component;
    wherein the print engine is further configured to prepare the response as an XML document that the print engine can send to the query component.

19. The system of claim 18, wherein the interface is configured to receive calls from a printer controller.

20. The system of claim 18, wherein the interface is configured to receive calls from a formatter.

21. The system of claim 18, wherein the interface comprises an application program interface (API).

22. A printer comprising:
    a printer controller having a query module that is configured to query a print engine to ascertain one or more printmodes that are supported by the print engine; and
    a print engine having an interface that is configured to be queried by the printer controller to ascertain one or more print modes that are supported by the print engine;
    wherein the print engine is further configured to:
    maintain a list of the printmodes that it supports;
    prepare a response to queries that it receives, said response comprising an XML document describing the printmodes; and
    send the response to the query component.

23. The printer of claim 22, wherein the print engine is further configured to:
   maintain a list of the printmodes that it supports;
   prepare a response to queries that it receives, said response describing the printmodes; and
   send the response to the query component.

24. A method comprising:
   associating a printer controller with a print engine;
   generating a query to ascertain printmode capabilities of the print engine;
   sending the query to a print engine;
   receiving, with the printer controller, a list prepared by the print engine that describes the printmodes supported by the print engine; and
   utilizing one or more listed printmodes to process data that is intended for printing;
   wherein the act of receiving comprises receiving an XML list and further comprises parsing the XML list of ascertain information associated with the printmodes that are supported by the print engine.

25. The method of claim 24, wherein the act of associating comprises assembling the printer controller and the print engine within a housing of a printer.

26. The method of claim 24, wherein the printer controller is configured to be used with different types of print engines.

* * * * *

UNITED STATES PATENT AND TRADEMARK OFFICE
CERTIFICATE OF CORRECTION

PATENT NO. : 7,391,534 B2 Page 1 of 1
APPLICATION NO. : 10/447780
DATED : June 24, 2008
INVENTOR(S) : Trung Vu Nguyen et al.

It is certified that error appears in the above-identified patent and that said Letters Patent is hereby corrected as shown below:

In column 8, line 22, in Claim 16, delete "described" and insert -- describes --, therefor.

In column 10, line 4, in Claim 24, after "XML list" delete "of" and insert -- to --, therefor.

Signed and Sealed this

Eleventh Day of November, 2008

JON W. DUDAS
*Director of the United States Patent and Trademark Office*